United States Patent
Zhu et al.

(10) Patent No.: US 10,360,260 B2
(45) Date of Patent: Jul. 23, 2019

(54) SYSTEM AND METHOD FOR SEMANTIC ANALYSIS OF SONG LYRICS IN A MEDIA CONTENT ENVIRONMENT

(71) Applicant: SPOTIFY AB, Stockholm (SE)

(72) Inventors: Ranqi Zhu, New York City, NY (US); Minwei Gu, New York City, NY (US); Vibhor Jain, New York City, NY (US)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/366,998

(22) Filed: Dec. 1, 2016

(65) Prior Publication Data
US 2018/0157746 A1    Jun. 7, 2018

(51) Int. Cl.
*G06F 17/30* (2006.01)
*G06F 16/638* (2019.01)
(Continued)

(52) U.S. Cl.
CPC .......... *G06F 16/638* (2019.01); *G06F 16/30* (2019.01); *G06F 16/685* (2019.01);
(Continued)

(58) Field of Classification Search
CPC ........ G06F 17/30769; G06F 17/30746; G06F 17/2705; G06F 17/274; G06F 17/278;
(Continued)

(56) References Cited

U.S. PATENT DOCUMENTS 5,649,060 A * 7/1997 Ellozy ............... G06F 17/30746
                                                    369/25.01
7,277,766 B1 * 10/2007 Khan ................ G06F 17/30743
                                                    380/237

(Continued)

FOREIGN PATENT DOCUMENTS

EP        1542139      6/2005
WO     2016009321      1/2016

OTHER PUBLICATIONS

"The Stanford CoreNLP Natural Language Processing Toolkit"; Manning, Christopher D., Mihai Surdeanu, John Bauer, Jenny Finkel, Steven J. Bethard, and David McClosky. In Proceedings of the 52nd Annual Meeting of the Association for Computational Linguistics: System Demonstrations, pp. 55-60. 2014. Downloaded from (http://nlp.stanford.edu/pubs/StanfordCoreNlp2014.pdf) on Dec. 1, 2016. 6 pages.
"Stanford CoreNLP—a suite of core NLP tools" (Version 3.6.0). Author unknown. Downloaded from (http://stanfordnlp.github.io/CoreNLP/) on Oct. 10, 2016. 3 pages.
(Continued)

*Primary Examiner* — Shiow-Jy Fan
(74) *Attorney, Agent, or Firm* — Tucker Ellis LLP

(57) ABSTRACT

In accordance with an embodiment, described herein is a system and method for semantic analysis and use of song lyrics in a media content environment. Semantic analysis is used to identify persons, events, themes, stories, or other meaningful information within a plurality of songs. For each song, a story graph is generated which describes a narrative within that song's lyrics. The story graph is then used to determine a feature vector associated with the song's narrative. In response to receiving an input vector, for example as a search input for a particular song track, the input vector can be matched against feature vectors of the plurality of songs, to determine appropriate tracks. Example use cases include the selection and delivery of media content in response to input searches for songs of a particular nature, or the recommendation or suggestion of media content in social messaging or other environments.

20 Claims, 12 Drawing Sheets

(51) Int. Cl.
*G06F 16/683* (2019.01)
*G06F 17/27* (2006.01)
*G06F 16/30* (2019.01)

(52) U.S. Cl.
CPC ........ *G06F 17/274* (2013.01); *G06F 17/2705* (2013.01); *G06F 17/278* (2013.01); *G06F 17/2785* (2013.01)

(58) Field of Classification Search
CPC .... G06F 17/2785; G06F 16/683; G06F 16/68; G06F 16/634; G06F 16/685; G06F 16/635; G06F 16/285; G06F 16/30
USPC .... 707/E17.101, 780, 99.005, E17.014, 736, 707/749
See application file for complete search history.

(56) References Cited

U.S. PATENT DOCUMENTS

| | | | | |
|---|---|---|---|---|
| 7,996,379 | B1* | 8/2011 | Jain | G06F 17/30864 707/706 |
| 2002/0002899 | A1* | 1/2002 | Gjerdingen | G06F 17/30743 84/667 |
| 2002/0010715 | A1* | 1/2002 | Chinn | G06F 3/16 715/236 |
| 2002/0163533 | A1* | 11/2002 | Trovato | G10H 1/368 715/728 |
| 2004/0266337 | A1* | 12/2004 | Radcliffe | G10H 1/0008 455/3.06 |
| 2005/0125394 | A1* | 6/2005 | Kodama | G06F 17/30017 |
| 2007/0131094 | A1* | 6/2007 | Kemp | G06F 17/30743 84/609 |
| 2008/0040362 | A1* | 2/2008 | Aucouturier | G06F 17/30265 |
| 2009/0277322 | A1* | 11/2009 | Cai | G10H 1/0058 84/609 |
| 2009/0307207 | A1* | 12/2009 | Murray | G06F 17/30026 |
| 2009/0307213 | A1* | 12/2009 | Deng | G06F 17/30705 |
| 2011/0273455 | A1* | 11/2011 | Powar | G06F 17/30769 345/473 |
| 2012/0303663 | A1* | 11/2012 | Asikainen | G06F 17/3069 707/780 |
| 2016/0140643 | A1 | 5/2016 | Nice et al. | |

OTHER PUBLICATIONS

"Stanford CoreNLP—a suite of core NLP tools" (Version 3.7.0). Author unknown. Downloaded from (http://stanfordnlp.github.io/CoreNLP/) on Dec. 1, 2016. 4 pages.

"Software—The Stanford Natural Language Processing Group". Author unknown. Downloaded from (http://nlp.stanford.edu/software/) on Dec. 1, 2016. 2 pages.

Hua Wen, et al. "Short text understanding through lexical-semantic analysis", 2015 IEEE 31st International Conference on Data Engineering, IEEE, Apr. 13, 2015, pp. 495-506, 12 pages.

Extended European Search Report dated Jan. 15, 2018 for European Patent Application No. 17204577.5, 16 pages.

European Office Action, Communication pursuant to Article 94(3) EPC dated Mar. 6, 2019 for European Patent Application No. 17204577.5, 9 pages.

* cited by examiner

Suzanne takes you down to her place near the river. You can hear the boats go by you can spend the night beside her. And you know that she's half crazy but that's why you wanna be there. And she feeds you tea and oranges that come all the way from China. And just when you mean to tell her that you have no love to give her. Then she gets you on her wavelength and she lets the river answer. That you've always been her lover.

FIGURE 6

Named Entity Recognition
340

FIGURE 7

Determination of Basic Dependencies
350

Determination of
Co-References
360

Determination of
Parts-of-Speech
370

SYSTEM AND METHOD FOR SEMANTIC ANALYSIS OF SONG LYRICS IN A MEDIA CONTENT ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to providing digital media content, such as music or video content, and are particularly related to systems and methods for semantic analysis and use of song lyrics in a media content environment.

BACKGROUND

Today's consumers of media content enjoy the ability to access a tremendous amount of streamed media content, such as music, songs, and videos, at any location or time of day, using a wide variety of media devices.

However, although a user can often download or otherwise obtain copies of a particular song's lyrics, a traditional media content delivery system provides little in the way of any semantic understanding of the media content or lyrics, or providing media content based on such an understanding.

These are some examples of the types of environments within which embodiments of the invention can be used.

SUMMARY

In accordance with an embodiment, described herein is a system and method for semantic analysis and use of song lyrics in a media content environment. Semantic analysis is used to identify persons, events, themes, stories, or other meaningful information within a plurality of songs. For each song, a story graph is generated which describes a narrative within that song's lyrics. The story graph is then used to determine a feature vector associated with the song's narrative. In response to receiving an input vector, for example as a search input for a particular song track, the input vector can be matched against feature vectors of the plurality of songs, to determine appropriate tracks. Example use cases include the selection and delivery of media content in response to input searches for songs of a particular nature, or the recommendation or suggestion of media content in social messaging or other environments.

BRIEF DESCRIPTION OF THE FIGURES

FIG. 6 illustrates an example semantic analysis of a song's lyrics, in accordance with an embodiment.

FIG. 7 further illustrates an example semantic analysis of a song's lyrics, in accordance with an embodiment.

DETAILED DESCRIPTION

As described above, although today's consumers of media content enjoy the ability to access a tremendous amount of streamed media content, such as music, songs, and videos, a traditional media content delivery system provides little in the way of any semantic understanding of a particular media content or lyrics, or providing media content based on such an understanding.

To address this, in accordance with an embodiment, described herein is a system and method for semantic analysis and use of song lyrics in a media content environment.

Media Content Environment

Figure 1:
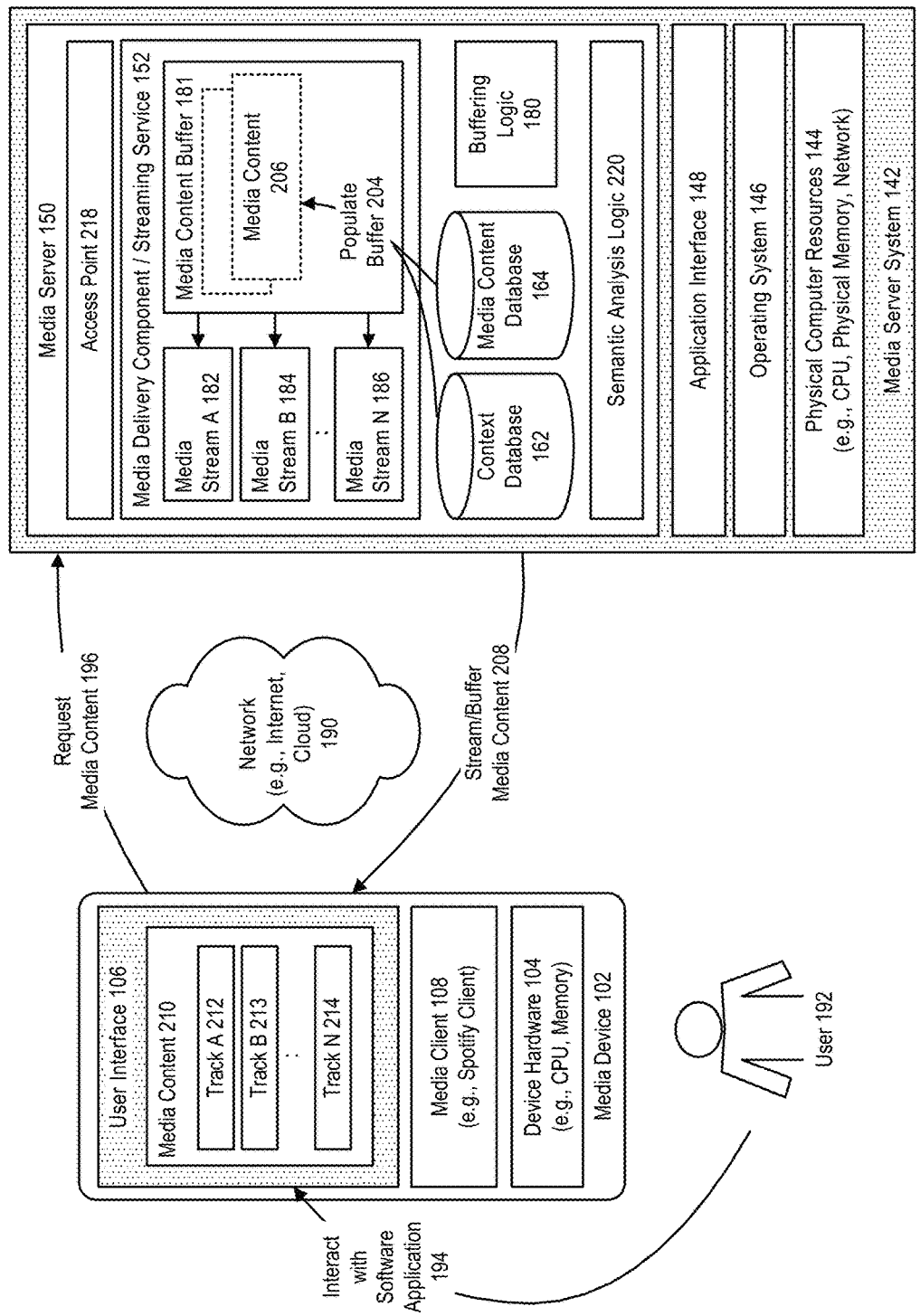
FIG. 1 illustrates an example of a media content environment, in accordance with an embodiment.

FIG. 1 illustrates an example of a media content environment, in accordance with an embodiment.

As illustrated in FIG. 1, in accordance with an embodiment, a media device 102, operating as a client device, can receive and play media content provided by a media server system 142 (media server), or by another system or peer device.

In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application or media client 108 (e.g., in a Spotify environment, a Spotify client), together with an in-memory client-side media content buffer, and a data buffering logic or software component, which can be used to control the playback of media content received from the media server, for playing either at a requesting media device (i.e., a controlling device) or at a controlled media device (i.e., a controlled device), in the manner of a remote control. A connected media environment firmware, logic or software component enables the media devices to participate within a connected media environment.

In accordance with an embodiment, the media server can include an operating system 146 or other processing environment, which supports execution of a media server application 150 that can be used, for example, to stream music, video, or other forms of media content to a client media device, or to a controlled device.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences.

In accordance with an embodiment, the media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state, which is then synchronized with other devices as needed.

In accordance with an embodiment, a media content database 164 can include media content, for example music, songs, videos, movies, or other types of media content, together with metadata describing that media content. The metadata can be used to enable users and client media devices to search within repositories of media content, to locate particular media content items.

In accordance with an embodiment, a buffering logic or software component 180 can be used to retrieve or otherwise access media content items, in response to requests from client media devices or other systems, and to populate a server-side media content buffer 181, at a media delivery component or streaming service 152, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. A user 192 can interact 194 with the user interface at a client media device, and issue requests to access media content, for example the playing of a selected music or video item either at their device, or at a controlled device; or the streaming of a media channel or video stream to their device, or to a controlled device.

For example, in accordance with an embodiment, the user's selection of a particular media option can be communicated 196 to the media server, via the server's media application interface. The media server can populate its media content buffer at the server 204, with corresponding media content, 206 including one or more streams of media content data. The media server can then communicate 208 the selected media content to the user's media device, or to the controlled device as appropriate, where it can be buffered in a media content buffer for display as media content 210, for example as tracks 212, 213, 214, for selection and playing at the device.

In accordance with an embodiment, the system can include a server-side media gateway or access point 218, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to Spotify back-end processes via a Spotify "accesspoint", which forwards client requests to other servers, on behalf of the client or end user.

In accordance with an embodiment, the system can also include a semantic analysis logic or software component 220, which can be used to support semantic analysis of song lyrics in a media content environment, as further described below.

Semantic Analysis of Song Lyrics

In accordance with an embodiment, the system can employ a computer executable program code which performs a semantic analysis of song lyrics, for use in a media content environment.

Generally described, semantic analysis can be used to identify persons, events, themes, stories, or other meaningful information within a plurality of songs.

In accordance with an embodiment, for each song, a story graph is generated which describes a narrative within that song's lyrics. The story graph is then used to determine a feature vector associated with the song's narrative.

In response to receiving an input vector, for example as a search input for a particular song track, the input vector can be matched against feature vectors of the plurality of songs, to determine appropriate tracks.

Although many songs include lyrics that describe a story-like narrative, perhaps regarding various persons and their interactions; other songs may include a simpler degree of narrative content, perhaps only a few sentences.

In accordance with an embodiment, as referred to herein a narrative can include any amount of text within a song's lyrics that conveys a meaningful information, such as a description of one or more persons, events, themes, or stories. The various systems and techniques described herein can be generally used with any type of song, having any degree of narrative content.

In accordance with an embodiment, the lyrics associated with a particular song can be obtained, for example, by accessing a lyrics database that stores a large number of lyrics files (associated with a correspondingly large number of songs); or by scraping or otherwise retrieving the lyrics for the song, in an as-needed manner, from one or more lyrics sources, such as from an Internet-accessible lyrics service.

When the lyrics associated with a particular song have been accessed, retrieved, or otherwise obtained, the system can employ a semantic analysis in the processing of the song's lyrics, as further described below.

In accordance with an embodiment, a natural language processing (NLP) software library, or other type of software code or program that is executable by a computer including a processor, can be used to parse the actual language of the lyrics within a song.

Examples of the types of NLP software libraries that can be used to provide such parsing include, in accordance with an embodiment, the Stanford CoreNLP library, produced by the Stanford University NLP Group, and described for example in "The Stanford CoreNLP Natural Language Processing Toolkit", Manning, et al., In Proceedings of the 52nd Annual Meeting of the Association for Computational Linguistics: System Demonstrations, pp. 55-60.

In accordance with other embodiments, other types of NLP software library or computer executable program code can be used to parse the actual language of the lyrics within a song.

In accordance with an embodiment, the parsing of the song's lyrics can include extracting information describing higher-level components within the song that are expressed by the lyrics, such as, for example, the various persons that may be referenced within the song's narrative, and their various interactions.

In accordance with an embodiment, the system can then generate a story graph, for example as a linked data structure, that describes the narrative, with the higher-level components of the narrative represented as nodes within the story graph.

Generally, each song or set of lyrics can be associated with its own story graph; so, for example, a million song tracks can be associated with a million corresponding story graphs. In some instances, a story graph for a particular song can contain multiple sub-graphs.

In accordance with an embodiment, for each story graph (or sub graph) that is generated, the system can determine one or more chains of nodes, each of which may include, for example, nouns that are indicative of particular persons identified within the song, and verbs related to those persons and that reflect the narrative associated with them, within the corresponding song.

Generally, a longer chain length is indicative of a song having a high degree of narrative content; while conversely, a shorter chain length is indicative of a song having a lesser degree of narrative content.

In accordance an embodiment, the system can also determine, based, for example, on the verbs associated with a particular person in the song's narrative, one or more characteristics potentially describing that person.

In accordance an embodiment, the story graph is then used to determine, by the system, a feature vector associated with the song's narrative.

For a particular song, the system can determine a feature vector which associates particular values with attributes of the story graph, and which in turn provides a numerical vector that reflects the underlying semantics of the song.

For example, in accordance with an embodiment, the system might determine, for a particular song and story graph: the number of persons, number of locations, number of subgraphs, and/or the maximum length of a reference chain provided within the story graph; together with a descriptor of any inter-person relations and/or a descriptor of sentiment varieties. The system can then use this information to associate particular values with attributes of the story graph, and determine a numerical vector that reflects the underlying semantics of the song.

Depending on the particular embodiment, different types of feature vectors can be generated by the system, using different attributes of the story graph, to address different use cases.

In accordance with an embodiment, when the feature vectors have been determined for a plurality of songs, the system can then use this information to subsequently determine appropriate songs, within that plurality of songs, to address particular use cases.

Example use cases include the selection and delivery of media content in response to input searches for songs of a particular nature; or the recommendation or suggestion of media content in social messaging or other environments.

For example, in accordance with an embodiment, the system can provide a search functionality that enables a user to provide a search string for a particular song track, say by title, or artist, including the use of wildcards, which can be used to construct an input vector; and which in turn can then be compared against the feature vectors of a plurality of song tracks, to determine matching song tracks.

In accordance with another example embodiment, the system can provide a functionality that enables a user to specify, say, a set of words, which are then used to automatically generate an input vector; and which in turn can then be compared against the feature vectors of a plurality of song tracks, to determine recommended song tracks.

For example, in accordance with an embodiment, the system can use a software library or other type of computer executable program code, such as a word2vec library, to receive words or phrases in accordance with a lyrics vocabulary, and generate an input vector.

The system can then match that input vector against, e.g., a lyrics database that stores a large number of lyrics files associated with song tracks, or another lyrics source.

An advantage of this approach is that the input vector can be matched against the feature vectors associated with the various database of song tracks, which enables the system to take advantage of the feature vectors, while allowing the matching to be performed without a need for semantic understanding of the input vector or feature vectors themselves.

In accordance with an embodiment, the systems and methods described above can be used, for example, to provide music recommendations in a media content environment.

For example, in accordance with an embodiment, the semantic analysis of a set of potential song tracks, for providing as recommended media content, can be implemented within the system as a processing pipeline, including a computer executable program code that performs a ranking analysis, and scores parts of an input vector against a plurality of song tracks during a first iteration, potentially followed by a second iteration, and so on, until an acceptable result is determined.

Semantic Analysis Environment

Figure 2:
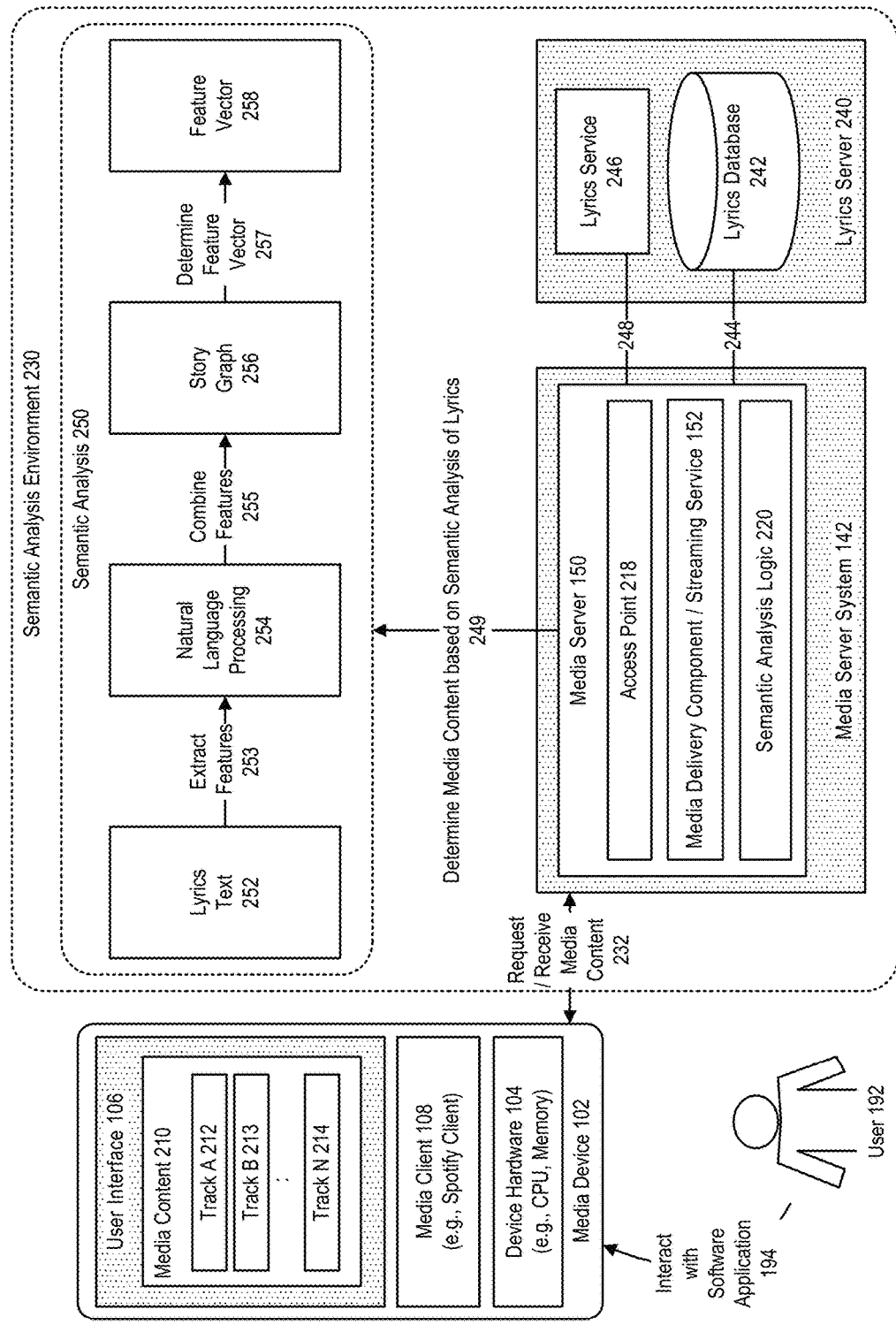
FIG. 2 illustrates a system which supports semantic analysis of song lyrics, for use in a media content environment, in accordance with an embodiment.

FIG. 2 illustrates a system which supports semantic analysis of song lyrics, for use in a media content environment, in accordance with an embodiment.

As illustrated in FIG. 2, in accordance with an embodiment, the semantic analysis environment 230 can be used to process a request for media content 232, by referring to the content of a lyrics server 240, including at least one of accessing 244 a lyrics database, and/or accessing 248 a lyrics service 246.

As described above, in accordance with an embodiment, the lyrics database stores a large number of lyrics files (associated with a correspondingly large number of songs)

In accordance with an embodiment, the system can then determine one or more appropriate media content, based on a semantic analysis of lyrics 249 associated with a song track.

In accordance with an embodiment, and as further described below, the semantic analysis 250 can be performed, for example by a processing pipeline that includes: receiving a lyrics text 252; extracting features from the lyrics text 253, for example using a natural language processing (NLP) library 254; combining features from the lyrics text 255 to generate a story graph 256; and determining from the story graph 257 one or more feature vectors 258.

Figure 3:
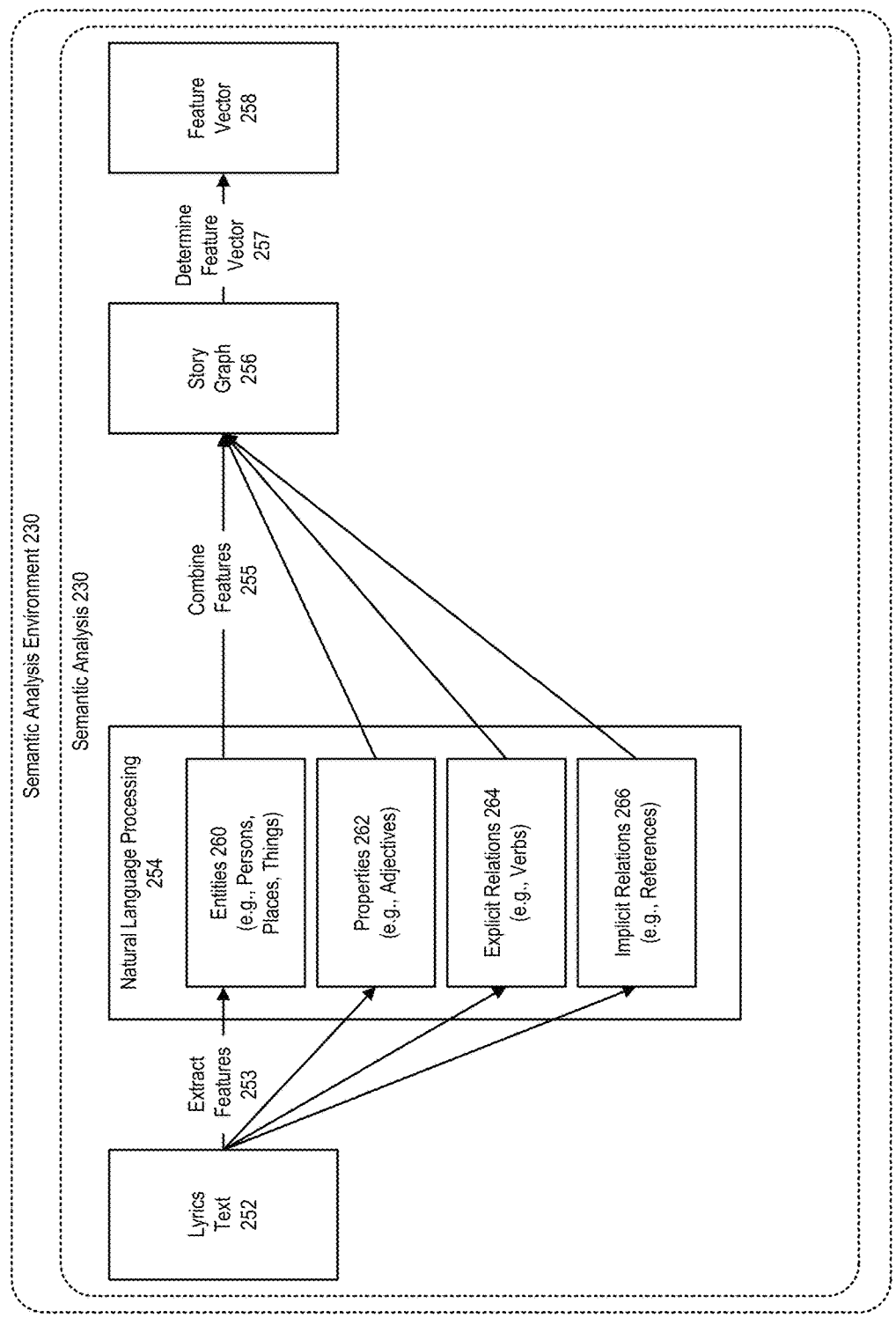
FIG. 3 illustrates the semantic analysis of song lyrics, in accordance with an embodiment.

FIG. 3 illustrates the semantic analysis of song lyrics, in accordance with an embodiment.

As described above, in accordance with an embodiment, the semantic analysis process can include combining features from a song's lyrics text, to generate a story graph. As illustrated in FIG. 3, the process of generating a story graph can further include, for example, determining entities 260 (e.g., persons, places, things); properties 262 (e.g., adjectives); explicit relations 264 (e.g., verbs); or implicit relations 266 (e.g., references); or other features within the lyrics.

The above examples of higher-level components and features are provided by way of example, to illustrate a particular embodiment. In accordance with other embodiments, other types of higher-level components and features can be considered in creating the story graph.

Figure 4:
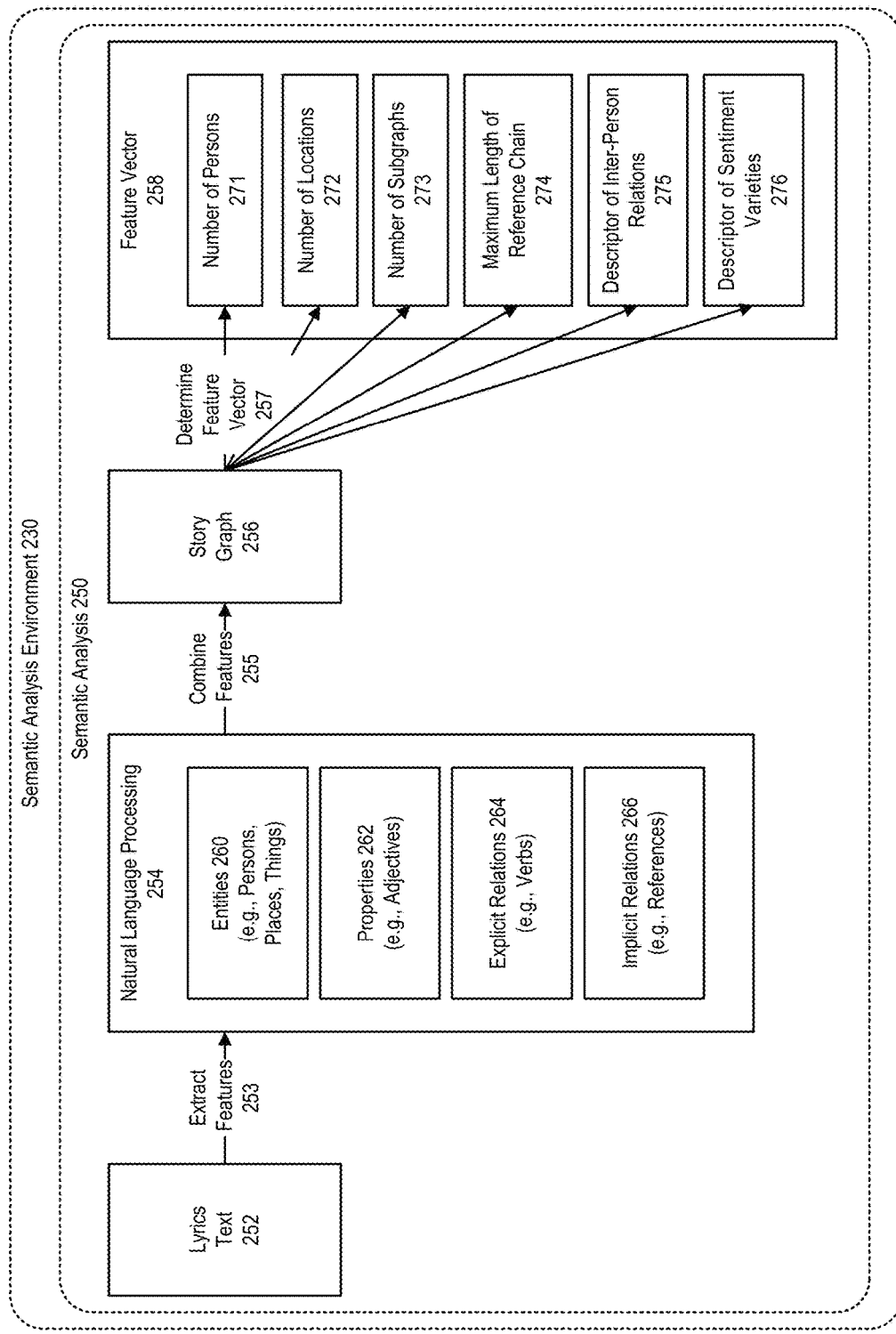
FIG. 4 further illustrates the semantic analysis of song lyrics, in accordance with an embodiment.

FIG. 4 further illustrates the semantic analysis of song lyrics, in accordance with an embodiment.

As described above, in accordance with an embodiment, the semantic analysis process can include determining, from the story graph, one or more feature vectors. As illustrated in FIG. 4, in accordance with an embodiment, the process of determining one or more feature vectors can further include, for example, determining, within the lyrics narrative, a number of persons 271; a number of locations 272; a number of subparagraph 273; a maximum length of a reference chain 274, a descriptor of inter-person relations 275; a descriptor of sentiment varieties 276; or other attribute of a feature vector value.

The above examples of story graph attributes that can be used to determine a feature vector are similarly provided by way of example, to illustrate a particular embodiment. In accordance with other embodiments, other types of story graph attributes can be considered in determining the feature vector.

Figure 5:
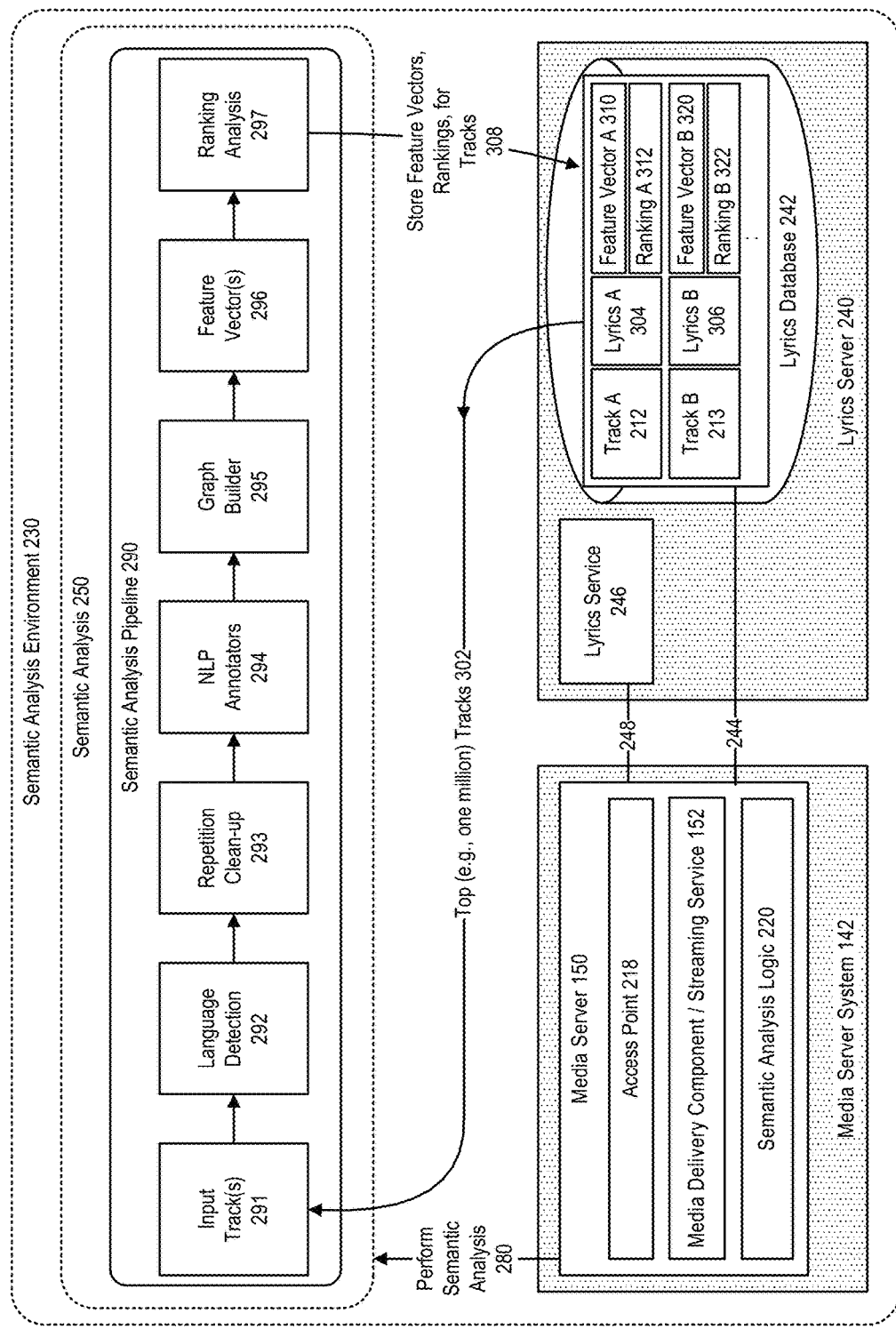
FIG. 5 illustrates a processing pipeline for semantic analysis of song lyrics, in accordance with an embodiment.

FIG. 5 illustrates a processing pipeline for semantic analysis of song lyrics, in accordance with an embodiment.

As illustrated in FIG. 5, in accordance with an embodiment, the system can receive a request to perform a semantic analysis 280, using a semantic analysis pipeline 290. In this example the semantic analysis pipeline receives one or more input tracks 291, performs a language detection 292, performs a repetition clean-up 293, processes with NPL annotators 294, performs a graph builder 295, determines feature vectors 296, and performs a ranking analysis 297.

For example, in accordance with an embodiment, the semantic analysis pipeline can be run for a number of song tracks, e.g., the one million most popular tracks 302; which in this example includes song tracks A and B; together with their lyrics A 304, and lyrics B 306, respectively.

In accordance with an embodiment, the output of the semantic analysis pipeline can include feature vectors and rankings for these tracks 308, including in this example a feature vector A 310 and ranking A 312; and a feature vector B 320 and ranking B 322.

The above is similarly provided by way of example, to illustrate a particular embodiment. In accordance with other embodiments, other types of pipelines, and logical steps, can be provided, to address particular use cases.

Example Semantic Analysis

FIG. 6 illustrates an example semantic analysis of a song's lyrics, in accordance with an embodiment.

As illustrated in FIG. 6, in accordance with an embodiment, the system can be used to process a song lyrics, an example of which might read:

"Suzanne takes you down to her place near the river, You can hear the boats go by you can spend the night beside her, And you know that she's half crazy but that's why you want to be there, And she feeds you tea and oranges that come all the way from China, And just when you mean to tell her that you have no love to give her, Then she gets you on her wavelength and she lets the river answer, That you've always been her lover."

As illustrated in FIG. 6, during a named entity recognition 340, the system can determine entities within the song's lyrics, for example in this instance, a person (Suzanne) 342, a time (night) 344, and a location (China 346).

FIG. 7 further illustrates an example semantic analysis of a song's lyrics, in accordance with an embodiment.

As illustrated in FIG. 7, in accordance with an embodiment, using the example song lyrics provided above, the system can then determine basic dependencies 350 within the song's lyrics, for example in this instance that "Suzanne takes you" 352.

Figure 8:
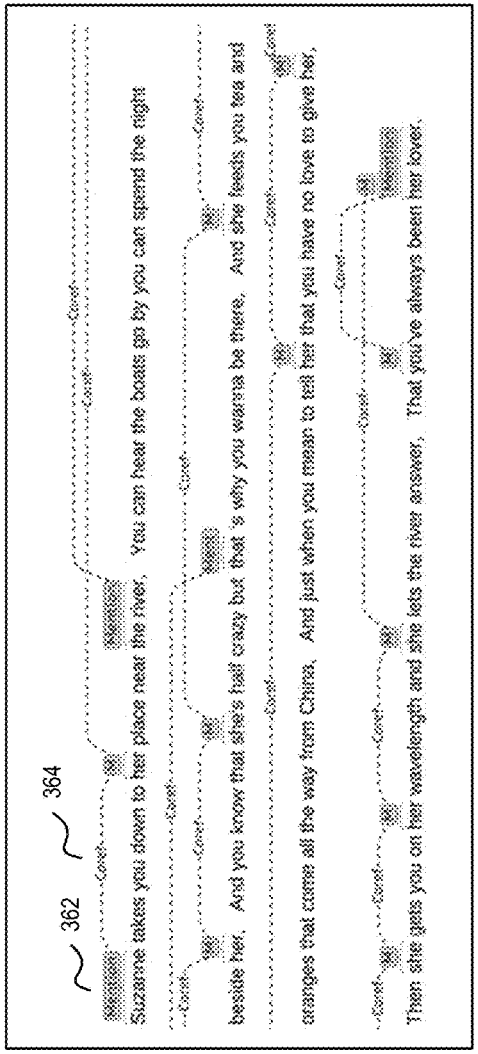
FIG. 8 further illustrates an example semantic analysis of a song's lyrics, in accordance with an embodiment.

FIG. 8 further illustrates an example semantic analysis of a song's lyrics, in accordance with an embodiment.

As illustrated in FIG. 8, in accordance with an embodiment, using the example song lyrics provided above, the system can then determine co-references 360 within the song's lyrics, for example in this instance that "Suzanne" (362) "takes you down to her place" (with "her place" being co-referenced 364 to "Suzanne").

Figure 9:
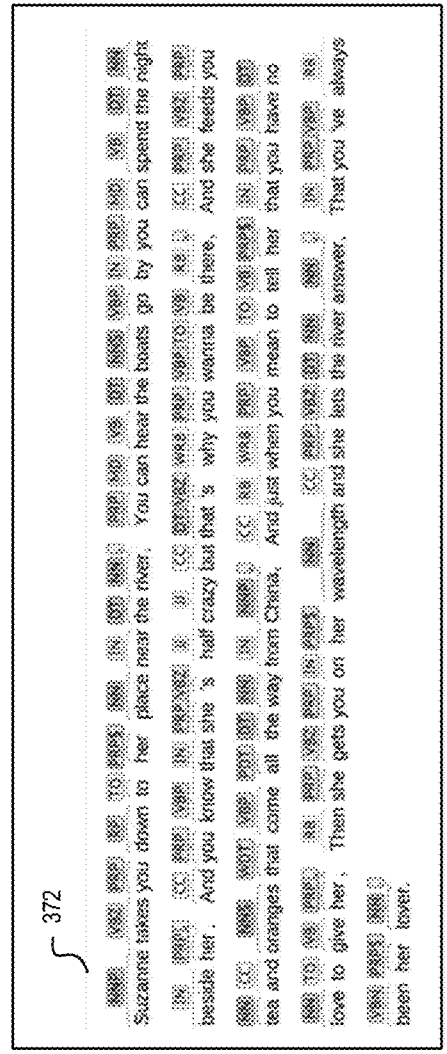
FIG. 9 further illustrates an example semantic analysis of a song's lyrics, in accordance with an embodiment.

FIG. 9 further illustrates an example semantic analysis of a song's lyrics, in accordance with an embodiment.

As illustrated in FIG. 9, in accordance with an embodiment, using the example song lyrics provided above, the system can then determine different parts of speech 370 within the song's lyrics, for example in this instance the noun "Suzanne", or the sentence particle "down" (372).

Figure 10:
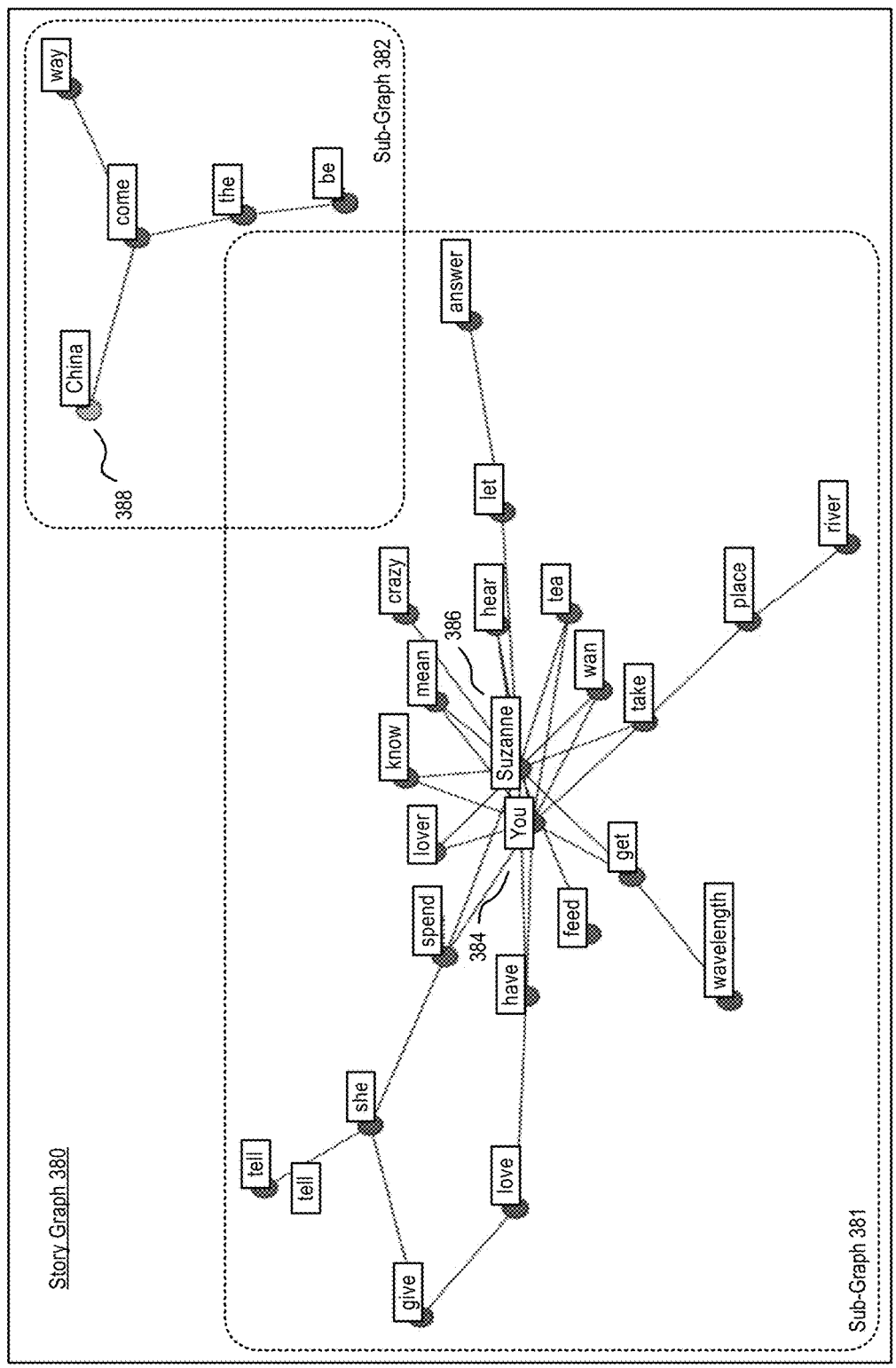
FIG. 10 illustrates an example story graph representative of the semantic analysis of a song's lyrics, in accordance with an embodiment.

FIG. 10 illustrates an example story graph representative of the semantic analysis of a song's lyrics, in accordance with an embodiment.

As illustrated in FIG. 10, in accordance with an embodiment, using the example song lyrics provided above, the system can generate a story graph 380 having two subgraphs, including in this instance a first sub-graph 381*n* discussing "You" and "Suzanne"; and a second sub-graph 382 discussing "China".

Semantic Analysis Use Cases

Figure 11:
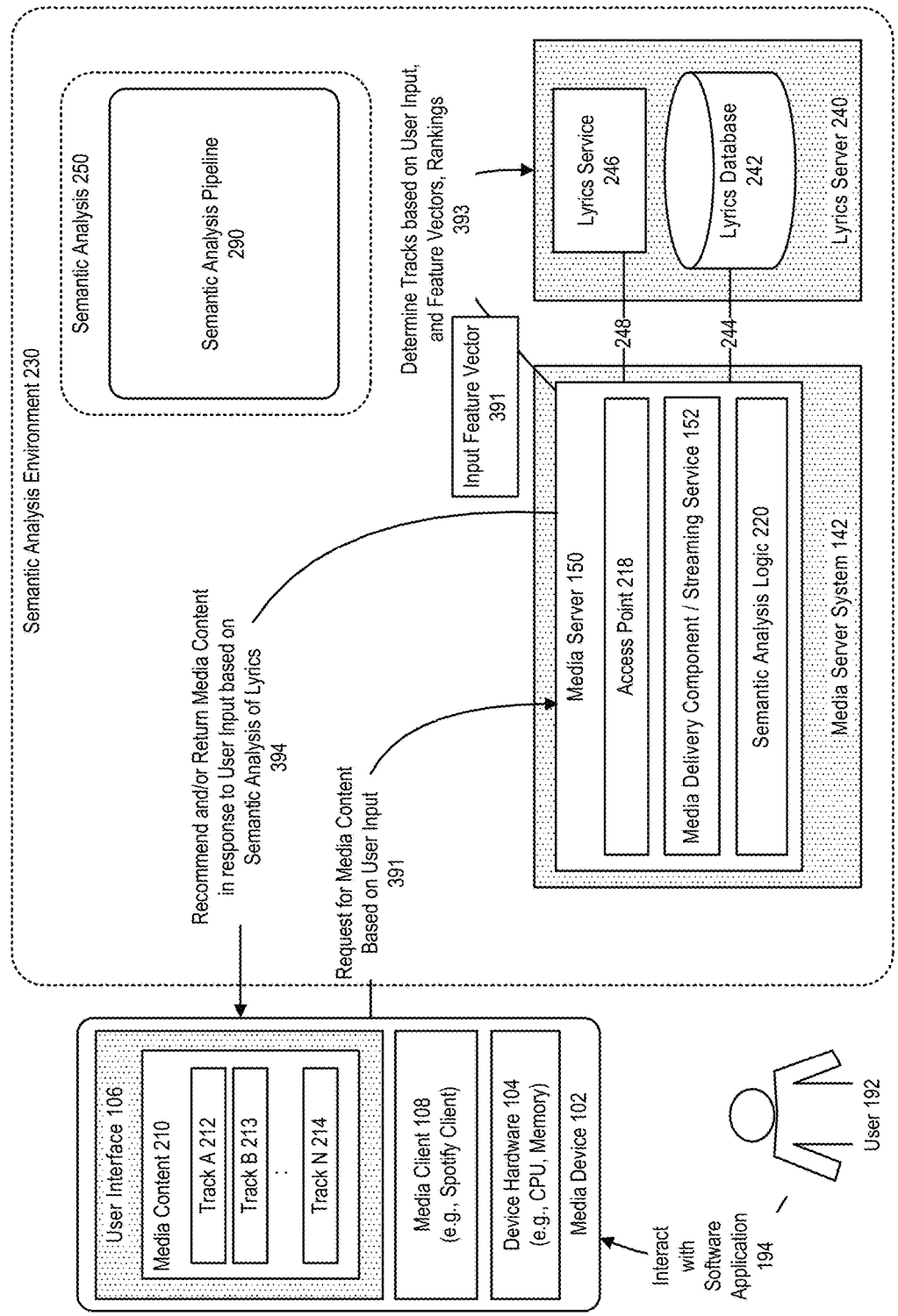
FIG. 11 illustrates an example use of semantic analysis of song lyrics, in accordance with an embodiment.

FIG. 11 illustrates an example use of semantic analysis of song lyrics, in accordance with an embodiment.

As illustrated in FIG. 11, in accordance with an embodiment, the system can be adapted to receive a request for media content based on a user input 392. Based on the request, the system can determine tracks based on the user input, and feature vectors, or rankings 393, of various songs. The system can then recommend and/or return a media content in response to the user input, based on the semantic analysis of lyrics 394.

Figure 12:
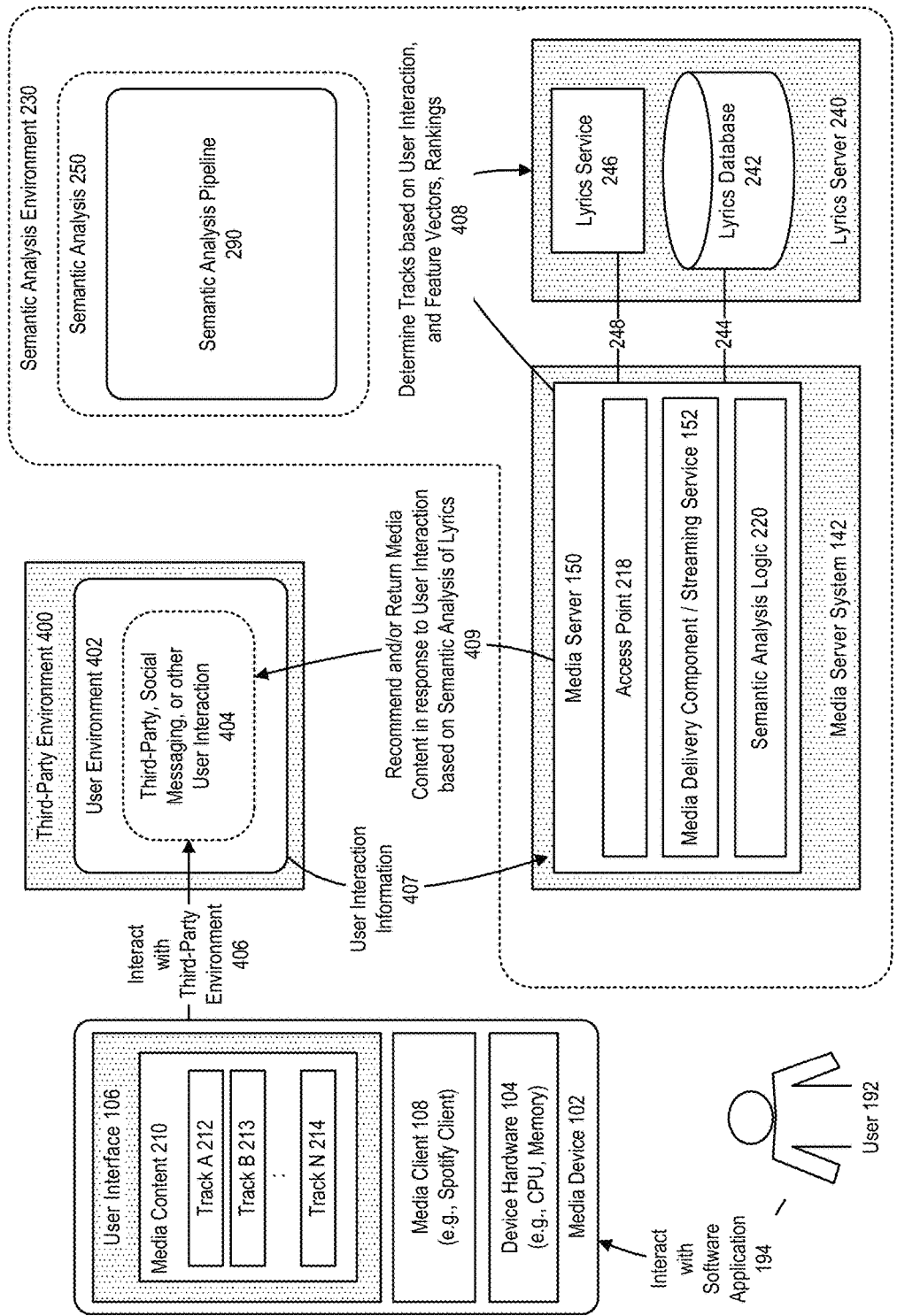
FIG. 12 illustrates another example use of semantic analysis of song lyrics, in accordance with an embodiment.

FIG. 12 illustrates another example use of semantic analysis of song lyrics, in accordance with an embodiment.

As illustrated in FIG. 12, in accordance with an embodiment, a third-party environment 400 can provide a user environment 402, for example as a third-party, social messaging environment, or other environment that supports user interaction 404.

In accordance with an embodiment, when the user interacts with the third-party environment 406, a user interaction information 407 can be passed to the semantic analysis environment, which can use this information in the manner described above, to recommend and/or return a media content in response to the user interaction, based on the semantic analysis of the lyrics.

Figure 13:
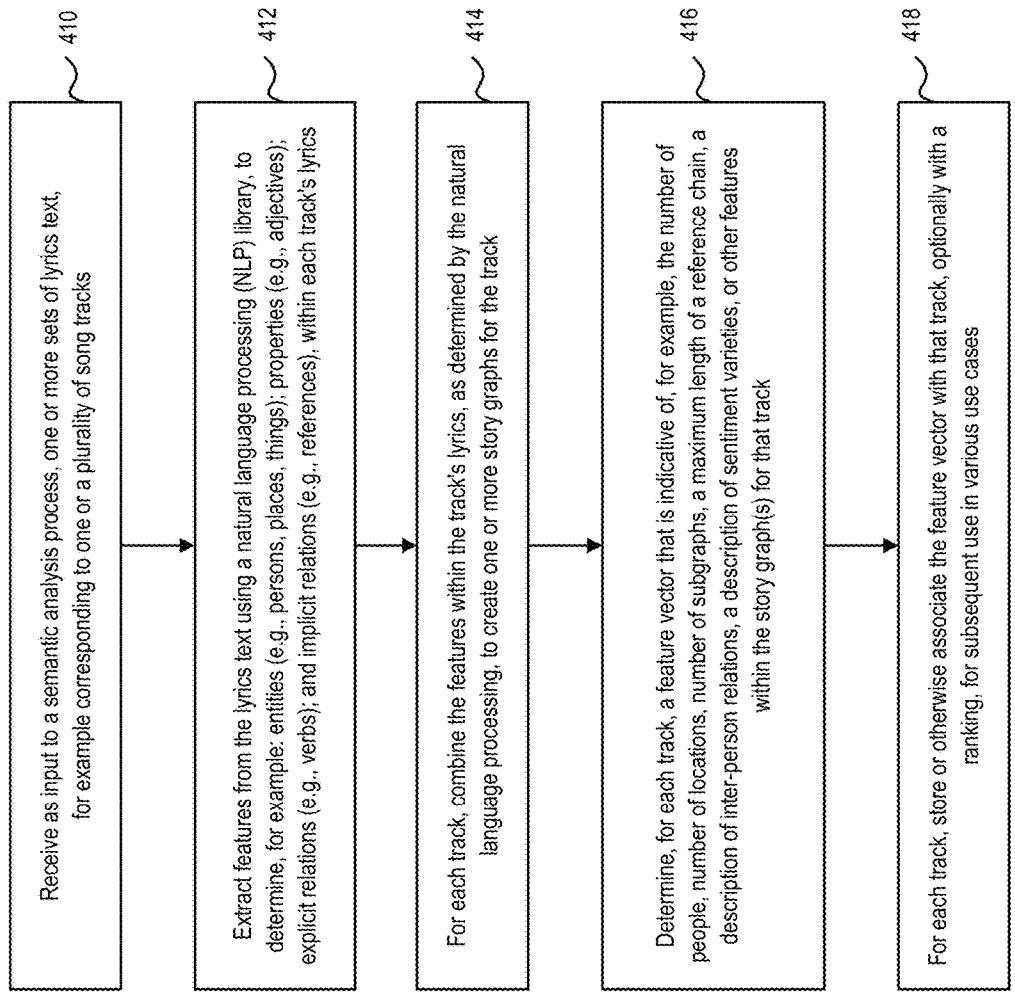
FIG. 13 illustrates an example process for use by a system in performing or using a semantic analysis of song lyrics, in accordance with an embodiment.

FIG. 13 illustrates an example process for use by a system in performing or using a semantic analysis of song lyrics, in accordance with an embodiment.

As illustrated in FIG. 13, in accordance with an embodiment, at step 410, the system can receive, as input to a semantic analysis process, one or more sets of lyrics text, for example corresponding to one or a plurality of song tracks.

At step 412, the system can extract features from the lyrics text using a natural language processing (NLP) library, to determine, for example: entities (e.g., persons, places, things); properties (e.g., adjectives); explicit relations (e.g., verbs); and implicit relations (e.g., references), within each track's lyrics.

At step 414, for each track, the system can combine the features within the track's lyrics, as determined by the natural language processing, to generate one or more story graphs for the track.

At step 416, the system can determine, for each track, a feature vector that is indicative of, for example, the number of persons, number of locations, number of subgraphs, a maximum length of a reference chain, a description of inter-person relations, a description of sentiment varieties, or other features within the story graph(s) for that track.

At step 418, for each track, the system can store or otherwise associate the feature vector with that track, optionally with a ranking, for subsequent use in various use cases.

Figure 14:
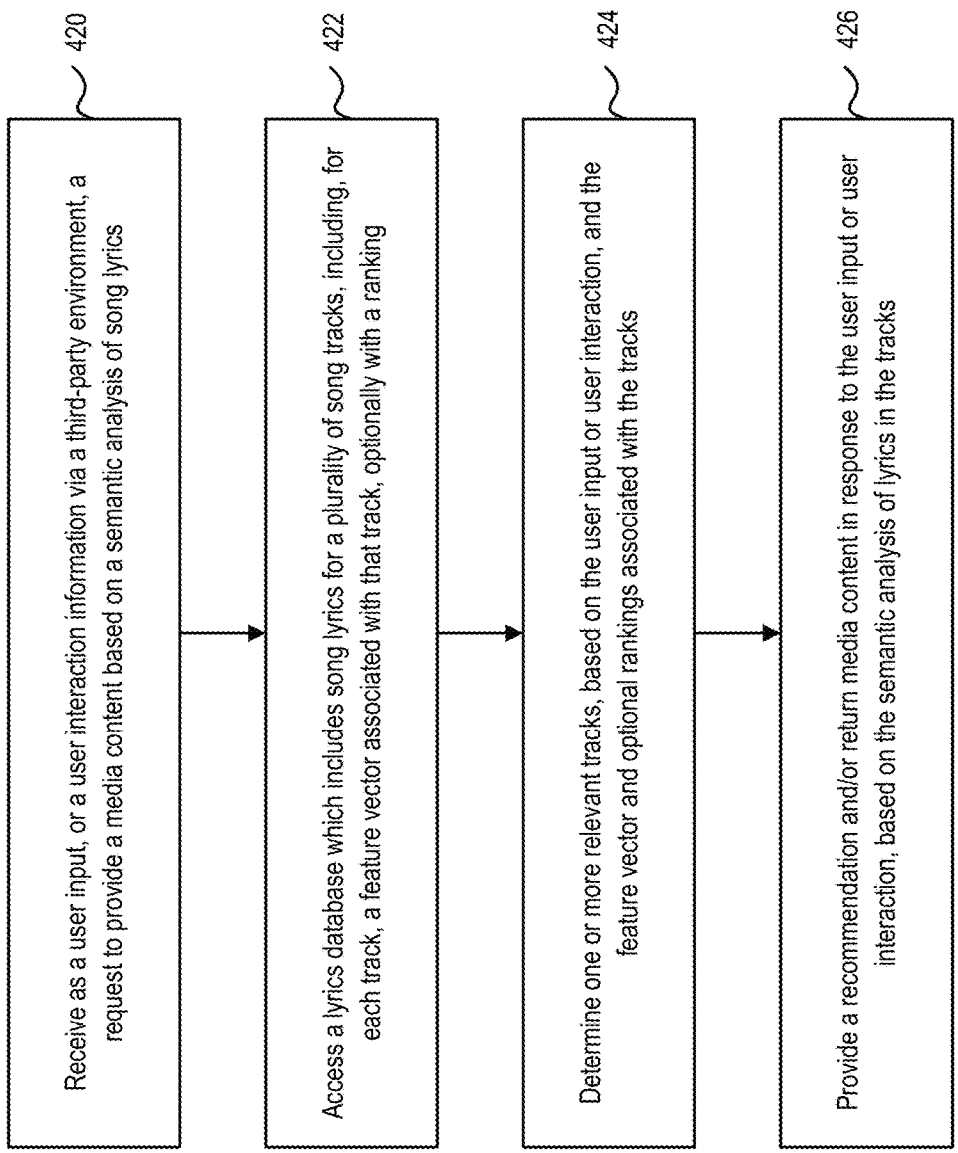
FIG. 14 illustrates an example process for use by a system in providing a recommendation and/or returning media content in response to a user input or user interaction, based on the semantic analysis of lyrics in the songs, in accordance with an embodiment.

FIG. 14 illustrates an example process for use by a system in providing a recommendation and/or returning media content in response to a user input or user interaction, based on the semantic analysis of lyrics in the songs, in accordance with an embodiment.

As illustrated in FIG. 14, in accordance with an embodiment, at step 420, the system can receive, as a user input, or a user interaction information via a third-party environment, a request to provide a media content based on a semantic analysis of song lyrics.

At step 422, the system can access a lyrics database which includes song lyrics for a plurality of song tracks, including, for each track, a feature vector associated with that track, optionally with a ranking.

At step 424, the system can determine one or more relevant tracks, based on the user input or user interaction, and the feature vector and optional rankings associated with the tracks.

At step 426, the system can provide a recommendation and/or returns a media content, in response to the user input or user interaction, based on the semantic analysis of lyrics in the tracks.

Embodiments of the present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for semantic analysis and use of song lyrics in a media content environment, comprising:
   one or more computers, including at least one processor and a media server executing thereon, that is adapted to receive requests from media clients for media content, and
   in response to receiving the requests, populate a server-side media content buffer with one or more streams of corresponding media content data, to be returned to at least one of a requesting device or a controlled device; and
   a computer executable program code that when executed by the system performs a semantic analysis of song lyrics associated with a plurality of song tracks that can be streamed to the media clients, including for each song track of the plurality of song tracks,
   creating a story graph that describes a narrative within the song's lyrics, by extracting features from lyrics text associated with the song's lyrics, in accordance with a natural language processing library, and populating a linked data structure with the extracted features to create the story graph associated with the song, creating one or more feature vectors describing the story graph, wherein each feature vector associates numerical values with attributes of the song's story graph, including that each feature vector associates, for each attribute of the story graph, a numerical value with that attribute, and storing each feature vector associated with the song's narrative as provided within the song's lyrics and described by the song's story graph, as a stored feature vector that is associated with the song track, to provide a plurality of stored feature vectors associated with the plurality of song tracks; and a computer executable program code that, in response to receiving a user input, determines an input vector associated with the user input, and matches the input vector associated with the user input against the plurality of stored feature vectors associated with the plurality of song tracks, to determine, based on matching the input vector against the plurality of stored feature vectors, one or more song tracks to at least one of provide or recommend for use with a media client, in response to receipt of the user input, and determination of the input vector.

2. The system of claim 1, wherein the system obtains the lyrics associated with a particular song by at least one of accessing a lyrics database that stores a large number of lyrics files, or by scraping or otherwise retrieving the lyrics for the song, in an as-needed manner, from one or more lyrics sources.

3. The system of claim 2, wherein access to the lyrics database is provided via a lyrics service.

4. The system of claim 1, wherein for each song, the system generates a story graph as a linked data structure that describes the narrative, with higher-level components of the narrative represented as nodes within the story graph.

5. The system of claim 1, wherein for each song, the system determines a feature vector which associates particular values with attributes of the story graph, and provides a numerical vector that is reflective of the underlying semantics of the song.

6. The system of claim 1, wherein the system provides a functionality that enables a user to provide at least one of a search string for a particular song track, or other input, which is used to construct an input vector that is compared against the plurality of stored feature vectors of a plurality of song tracks, to determine at least one of matching or recommended song tracks.

7. The system of claim 1, wherein for each of the plurality of song tracks, the feature vector for that song is stored in a lyrics database and associated with the song and its lyrics.

8. The system of claim 1, wherein the input vector from the media client is received via a user interaction at a third-party environment.

9. The system of claim 8, wherein the media server uses the input vector received via the user interaction at the third-party environment to access a lyrics database and determine the one or more song tracks to at least one of provide or recommend to the media client, in response to receipt of the input vector.

10. The system of claim 1, wherein the system operates a semantic analysis pipeline that receives one or more input song tracks, determines feature vectors and rankings associated with the input song tracks, and outputs the feature vectors and rankings, including a first feature vector and first ranking associated with a first track, and a second feature vector and second ranking associated with a second track, for subsequent use in determining, based on matching the input vector against the feature vectors, one or more song tracks to at least one of provide or recommend for use with the media client.

11. A method for semantic analysis and use of song lyrics by a system in a media content environment, comprising:

providing, at one or more computers including at least one processor, a media server executing thereon, that is adapted to receive requests from media clients for media content, and in response to receiving the requests, populate a server-side media content buffer with one or more streams of corresponding media content data, to be returned to at least one of a requesting device or a controlled device; and performing a semantic analysis of song lyrics associated with a plurality of song tracks that can be streamed to the media clients, including for each song track of the plurality of song tracks, creating a story graph that describes a narrative within the song's lyrics, by extracting features from lyrics text associated with the song's lyrics, in accordance with a natural language processing library, and populating a linked data structure with the extracted features to create the story graph associated with the song, creating one or more feature vectors describing the story graph, wherein each feature vector associates numerical values with attributes of the song's story graph, including that each feature vector associates, for each attribute of the story graph, a numerical value with that attribute, and storing each feature vector associated with the song's narrative as provided within the song's lyrics and described by the song's story graph, as a stored feature vector that is associated with the song track, to provide a plurality of stored feature vectors associated with the plurality of song tracks; and in response to receiving a user input, determining an input vector associated with the user input, and matching the input vector associated with the user input against the plurality of stored feature vectors associated with the plurality of song tracks, to determine, based on matching the input vector against the plurality of stored feature vectors, one or more song tracks to at least one of provide or recommend for use with a media client, in response to receipt of the user input, and determination of the input vector.

12. The method of claim 11, wherein the system obtains the lyrics associated with a particular song by at least one of accessing a lyrics database that stores a large number of lyrics files, or by scraping or otherwise retrieving the lyrics for the song, in an as-needed manner, from one or more lyrics sources.

13. The method of claim 11, wherein for each song, the system generates a story graph as a linked data structure that describes the narrative, with higher-level components of the narrative represented as nodes within the story graph.

14. The method of claim 11, wherein for each song, the system determines a feature vector which associates particular values with attributes of the story graph, and provides a numerical vector that is reflective of the underlying semantics of the song.

15. The method of claim 11, wherein the system provides a functionality that enables a user to provide at least one of a search string for a particular song track, or other input, which is used to construct an input vector that is compared against the plurality of stored feature vectors of a plurality of song tracks, to determine at least one of matching or recommended song tracks.

16. A non-transitory computer readable storage medium, including instructions stored thereon which when read and executed by a system including one or more computers cause the one or more computers to perform the steps comprising:
   providing, at one or more computers including at least one processor, a media server executing thereon, that is adapted to
      receive requests from media clients for media content, and
      in response to receiving the requests, populate a server-side media content buffer with one or more streams of corresponding media content data, to be returned to at least one of a requesting device or a controlled device; and
   performing a semantic analysis of song lyrics associated with a plurality of song tracks that can be streamed to the media clients, including for each song track of the plurality of song tracks,
      creating a story graph that describes a narrative within the song's lyrics, by extracting features from lyrics text associated with the song's lyrics, in accordance with a natural language processing library, and populating a linked data structure with the extracted features to create the story graph associated with the song,
      creating one or more feature vectors describing the story graph, wherein each feature vector associates numerical values with attributes of the song's story graph, including that each feature vector associates, for each attribute of the story graph, a numerical value with that attribute, and
      storing each feature vector associated with the song's narrative as provided within the song's lyrics and described by the song's story graph, as a stored feature vector that is associated with the song track, to provide a plurality of stored feature vectors associated with the plurality of song tracks; and
   in response to receiving a user input,
      determining an input vector associated with the user input, and
      matching the input vector associated with the user input against the plurality of stored feature vectors associated with the plurality of song tracks, to determine, based on matching the input vector against the plurality of stored feature vectors, one or more song tracks to at least one of provide or recommend for use with a media client, in response to receipt of the user input, and determination of the input vector.

17. The non-transitory computer readable storage medium of claim 16, wherein the system obtains the lyrics associated with a particular song by at least one of accessing a lyrics database that stores a large number of lyrics files, or by scraping or otherwise retrieving the lyrics for the song, in an as-needed manner, from one or more lyrics sources.

18. The non-transitory computer readable storage medium of claim 16, wherein for each song, the system generates a story graph as a linked data structure that describes the narrative, with higher-level components of the narrative represented as nodes within the story graph.

19. The non-transitory computer readable storage medium of claim 16, wherein for each song, the system determines a feature vector which associates particular values with attributes of the story graph, and provides a numerical vector that is reflective of the underlying semantics of the song.

20. The non-transitory computer readable storage medium of claim 16, wherein the system provides a functionality that enables a user to provide at least one of a search string for a particular song track, or other input, which is used to construct an input vector that is compared against the plurality of stored feature vectors of a plurality of song tracks, to determine at least one of matching or recommended song tracks.

* * * * *